United States Patent
Åström et al.

(10) Patent No.: US 11,722,962 B2
(45) Date of Patent: *Aug. 8, 2023

(54) METHOD OF RECEIVING A WAKE-UP SIGNAL, WIRELESS DEVICE AND COMPUTER PROGRAM

(71) Applicant: Telefonaktiebolaget LM Ericsson (publ), Stockholm (SE)

(72) Inventors: Magnus Åström, Lund (SE); Muhammad Kazmi, Sundbyberg (SE); Yutao Sui, Solna (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,576

(22) Filed: Dec. 8, 2021

(65) Prior Publication Data
US 2022/0110061 A1    Apr. 7, 2022

Related U.S. Application Data

(63) Continuation of application No. 16/468,189, filed as application No. PCT/EP2019/058499 on Apr. 4, 2019, now Pat. No. 11,234,193.

(Continued)

(51) Int. Cl.
*H04W 52/02* (2009.01)
*H04W 74/08* (2009.01)

(52) U.S. Cl.
CPC ... *H04W 52/0235* (2013.01); *H04W 52/0251* (2013.01); *H04W 74/0833* (2013.01)

(58) Field of Classification Search
CPC ......... H04W 52/0235; H04W 52/0251; H04W 74/0833
See application file for complete search history.

(56) References Cited

U.S. PATENT DOCUMENTS

| | | |
|---|---|---|
| 2017/0347335 A1 | 11/2017 | Yi et al. |
| 2018/0270756 A1 | 9/2018 | Bhattad et al. |

(Continued)

OTHER PUBLICATIONS

International Search Report and Written Opinion dated May 15, 2019 for International Application No. PCT/EP2019/058499 filed on Apr. 4, 2019, consisting of 17-pages.

(Continued)

*Primary Examiner* — Gary Mui
(74) *Attorney, Agent, or Firm* — Christopher & Weisberg, P.A.

(57) ABSTRACT

A method of receiving a wake-up signal from a network node is performed by a wireless device. The method includes determining provided coverage enhancement level with respect to the network node, determining an activity level of the wireless device, determining a required wake-up signal reception effort, wherein the wake-up signal reception effort includes an amount of the redundancy of the wake-up signal being exploited at reception, based at least the coverage enhancement level and the activity level, and receiving a wake-up signal based on the determined reception effort. A wireless device having a wake-up receiver capable of receiving a wake-up signal from a network node and a computer program for implementing the method in the wireless device are also disclosed.

13 Claims, 3 Drawing Sheets

Related U.S. Application Data (60) Provisional application No. 62/653,727, filed on Apr. 6, 2018.

(56) References Cited

U.S. PATENT DOCUMENTS

| | | | |
|---|---|---|---|
| 2020/0022081 | A1 | 1/2020 | Ljung et al. |
| 2020/0029302 | A1 | 1/2020 | Cox et al. |
| 2020/0092808 | A1 | 3/2020 | Beale et al. |
| 2020/0092938 | A1* | 3/2020 | Tang ............... H04W 52/0229 |
| 2020/0178172 | A1 | 6/2020 | Thangarasa et al. |
| 2020/0221416 | A1 | 7/2020 | Wong et al. |
| 2020/0229095 | A1* | 7/2020 | Shrestha ............... H04W 4/70 |
| 2020/0260382 | A1 | 8/2020 | Ljung et al. |
| 2020/0359322 | A1 | 11/2020 | Hwang et al. |
| 2020/0367168 | A1 | 11/2020 | Hwang et al. |
| 2021/0037469 | A1 | 2/2021 | Åström et al. |
| 2021/0058893 | A1 | 2/2021 | Sha et al. |
| 2021/0058909 | A1 | 2/2021 | Wong et al. |
| 2021/0105719 | A1 | 4/2021 | Thangarasa et al. |
| 2021/0352581 | A1* | 11/2021 | Wong ............... H04W 52/0212 |

OTHER PUBLICATIONS

3GPP TSG RAN WG1 Meeting #91 R1-1720133; Title: Wake-up signal configurations and procedures; Agenda Item: 6.2.6.1.1.2; Source: Nokia, Nokia Shanghai Bell; Document for: Discussion and Decision; Location and Date: Reno, U.S., Nov. 27-Dec. 21, 2017, consisting of 5-pages.

3GPP TSG-RAN2 Meeting #101 R2-1802586; Title: Wake Up Signal in NB-IoT and MTC; Agenda Item: 9.13.9 Wake Up Signal; Source: Ericsson; Document for: Discussion and Decision; Location and Date: Athens, Greece, Feb. 26-Mar. 2, 2018, consisting of 11-pages.

3GPP TSG-RAN WG1 Meeting #92bis R1-1804139; Title: Wake Up Signal Configuration for NB-IoT; Agenda Item: 6.2.7.1.1.2; Source: Mediatek Inc.; Document for: Discussion and Decision; Location and Date: Sanya, China, Apr. 16-20, 2018, consisting of 7-pages.

3GPP TSG-RAN WG2 Meeting#101 R2-1802058; Title: Further consideration on wake-up signal; Agenda Item: 9.13.9; Source: ZIE, Sanechips; Document for: Discussion and Decision; Location and Date: Athens, Greece, Feb. 26-Mar. 2, 2018, consisting of 6-pages.

3GPP TSG-RAN WG4#88bis R4-1813095; Title: Simulation results for NB-IoT WUS receptions; Agenda Item: 6.4.4.1; Source: Ericsson; Document for: Discussion; Location and Date: Chengdu, P.R of China, Oct. 8-12, 2018, consisting of 6-pages.

3GPP TSG-RAN WG4 Meeting #89 R4-1815460; Title: Remaining work on minimum WUS reception requirements for NB-IoT; Source to WG: Ericsson; Work Item code: NB_IOTenh2-Perf; Location and Date: Spokane, USA, Nov. 12-16, 2018, consisting of 2-pages.

3GPP TSG-RAN WG4 Meeting #89 R4-1815461; Title: Introducing WUS reception requirements for efeMTC; Source to WG: Ericsson; Work Item code: LTE_eMTC4-Core; Location and Date: Spokane, USA, Nov. 12-16, 2018, consisting of 2-pages.

3GPP TSG-RAN WG1 #89 R1-1706887; Title: Power consumption reduction for paging and connected-mode DRX for NBIoT; Agenda Item: 6.2.7.1.1; Source: Ericsson; Document for: Discussion, Decision; Location and Date: Hangzhou, P.R. China, May 15-19, 2017, consisting of 5-pages.

* cited by examiner

METHOD OF RECEIVING A WAKE-UP SIGNAL, WIRELESS DEVICE AND COMPUTER PROGRAM

CROSS-REFERENCE TO RELATED APPLICATIONS

This application is a Continuation of U.S. application Ser. No. 16/468,189, filed Jun. 10, 2019 entitled "METHOD OF RECEIVING A WAKE-UP SIGNAL, WIRELESS DEVICE AND COMPUTER PROGRAM", which is a U.S. National Stage Patent Application of International Application No.: PCT/EP2019/058499, filed Apr. 4, 2019 entitled "METHOD OF RECEIVING A WAKE-UP SIGNAL, WIRELESS DEVICE AND COMPUTER PROGRAM," which claims priority to U.S. Provisional Application No. 62/653,727, filed Apr. 6, 2018, entitled "METHOD OF RECEIVING A WAKE-UP SIGNAL, WIRELESS DEVICE AND COMPUTER PROGRAM," the entireties of all of which are incorporated herein by reference.

TECHNICAL FIELD

The present disclosure generally relates to a method of receiving a wake-up signal (WUS) from a network node, performed by a wireless device selectable capable of coverage enhancement, such wireless device, and a computer program for implementing the method on a wireless device. In particular, there is provided an approach to determine a duration of the WUS detection, based on one more aspects of operation of the wireless device in idle state, which provides efficient power saving.

BACKGROUND

There has been a lot of work in $3^{rd}$ Generation Partnership Project (3GPP) lately on specifying technologies to cover Machine-to-Machine (M2M) and/or Internet of Things (IoT) related use cases. Most recent work for 3GPP Release 13 and 14 includes enhancements to support Machine-Type Communications (MTC) with new User Equipment (UE) categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

In this disclosure, reference will be made to Long Term Evolution (LTE) enhancements introduced in 3GPP Release 13, 14 and 15 for MTC as "eMTC" (enhanced MTC), including, but not limited to, support for bandwidth-limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC and for NB-IoT. Some important differences include a new physical channel, such as the physical downlink control channels, called MTC Physical Downlink Control Channel (MPDCCH) in eMTC and NB-IoT Physical Downlink Control Channel (NPDCCH) in NB-IoT, and a new physical random access channel, NB-IoT Physical Random Access Channel (NPRACH), for NB-IoT. Another important difference is the coverage level, also known as coverage enhancement level, that these technologies can support. By applying repetitions to the transmitted signals and channels, both eMTC and NB-IoT allow UE operation down to much lower SNR level compared to LTE, i.e. $Es/Iot \geq -15$ dB being the lowest operating point for eMTC and NB-IoT which can be compared with −6 dB Es/IoT for "legacy" LTE.

A 'Wake-up signal' (WUS) is based on the transmission of a short signal that indicates to the UE that it should continue to decode the Downlink (DL) control channel e.g. full MPDCCH (for eMTC) or NPDCCH (for NB-IoT). If such signal is absent (Discontinuous Transmission (DTX) is applied, i.e. the UE does not detect it), then the UE can go back to sleep without decoding the DL control channel. The decoding time for a WUS is considerably shorter than that of the full MPDCCH or NPDCCH. This in turn reduces UE power consumption and leads to longer UE battery life. This is presented in 3GPP contribution R1-1706887, "Power consumption reduction for paging and connected-mode DRX for NB-IoT", by Ericsson. The WUS would be transmitted only when there is paging for the UE, and if there is no paging for the UE then the WUS will not be transmitted, i.e., implying DTX, and the UE would go back to sleep e.g. upon detecting DTX instead of WUS.

Cell coverage in both eMTC and NB-IoT is controlled by the maximum number of repetitions of DL channels, Rmax, used for transmitting a message. The Rmax values may be defined in values from 1 to 2048. The coverage for a specific number of repetitions, R, is not only dependent on R, but also on the message size, since a longer message typically requires a higher R compared with a shorter message, provided the same coverage. Paging messages using the MPDCCH for eMTC and NPDCCH for NB-IoT are typically the same size (not the same number of repetitions of that message, though) for a given cell, providing a constant maximum coverage.

A UE will wake-up and attempt to receive the WUS in order to know if it should make a further attempt to detect MPDCCH for eMTC and NPDCCH for NB-IoT, respectively. Since the WUS is only transmitted if a subsequent MPDCCH or NPDCCH will be transmitted, there will most often be no signal for the UE to detect.

According to legacy specification and UE behaviour, there is no procedure nor requirement defined regarding how the WUS shall be received by the UE. This can severely affect the WUS reception performance in the UE, and therefore also the MPDCCH or NPDCCH reception performance. The consequences may be twofold. Firstly, the UE may miss the paging, and may not respond the network request if the UE has been monitoring the paging for too short duration. Secondly, if UE has been monitoring paging for too long time, it may not achieve the power-saving gain that it can potentially achieve with WUS. Hence, there is a need for a method to improve efficiency of WUS detection.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' understanding that there is a need for an approach to determine a duration of the WUS detection, based on one more aspects of operation of the wireless device in idle state, which provides efficient power saving.

According to a first aspect, there is provided a method of receiving a wake-up signal from a network node. The method comprises determining a coverage enhancement level with respect to the network node, determining an activity level of the wireless device, determining a required wake-up signal reception effort, wherein the wake-up signal reception effort comprises an amount of the redundancy of the wake-up signal being exploited at reception, based on at least the coverage enhancement level and the activity level, and receiving the wake-up signal based on the determined reception effort.

The coverage enhancement levels may comprise normal coverage level and enhanced coverage level.

The redundancy of the wake-up signal may comprise repetitions of the wake-up signal. The reception effort may comprise an amount of repetitions to receive.

The activity level may comprise at least one of: discontinuous reception, DRX, configuration, mobility state of the wireless device, and type of service or application operated by the main receiver.

The determining of the required wake-up signal reception effort may comprise determining a time period for enabling the amount of the redundancy of the wake-up signal to be received. The receiving of the wake-up signal may comprise activating reception of the wake-up signal during the time period and then deactivating the wake-up receiver. The time period may be determined as a period covering the least amount of repetitions of the wake-up signal exceeding a determined amount of redundancy of the wake-up signal to be received.

The coverage enhancement levels may comprise a normal coverage level where no coverage enhancement is applied such that reception of a signal according to basic requirements is enabled, and one or more enhanced coverage levels which when applied enables reception of a weaker signal than the basic requirements.

The determining of the coverage enhancement level with respect to the network node may comprise at least one of: receiving information from the network node about configuration of assigned redundancy, measuring signals from the network node to determine assigned redundancy, accessing historical data about assigned redundancy, and detecting parameters from a physical random access channel, PRACH, indicative on the coverage enhancement level.

According to a second aspect, there is provided a wireless device comprising a wake-up receiver capable of receiving a wake-up signal from a network node. The wireless device is arranged to determine provided coverage enhancement level with respect to the network node, determine an activity level of the wireless device, determine a required wake-up signal reception effort, wherein the wake-up signal reception effort comprises an amount of the redundancy of the wake-up signal being exploited at reception, based on at least the coverage enhancement level and the activity level, and receive the wake-up signal based on the determined reception effort.

The coverage enhancement levels may comprise normal coverage level and enhanced coverage level.

The redundancy of the wake-up signal may comprise repetitions of the wake-up signal. The reception effort may comprise an amount of repetitions to receive.

The activity level may comprise at least one of: discontinuous reception, DRX, configuration, mobility state of the wireless device, or type of service or application operated by the main receiver.

The determination of the required wake-up signal reception effort may comprise a determination of a time period for enabling the amount of the redundancy of the wake-up signal to be received. The reception of the wake-up signal may comprise activation of enablement for receiving the wake-up signal during the time period and then deactivation of the wake-up receiver. The time period may be determined as a period covering the least amount of repetitions of the wake-up signal exceeding a determined amount of redundancy of the wake-up signal to be received.

The coverage enhancement levels may comprise a normal coverage level where no coverage enhancement is applied such that reception of a signal according to basic requirements is enabled, and one or more enhanced coverage levels which when applied enables reception of a weaker signal than the basic requirements.

The determination of provided coverage enhancement level with respect to the network node may include causing the wireless device to perform at least one of: receive information from the network node about configuration of assigned redundancy, measure signals from the network node to determine assigned redundancy, access historical data about assigned redundancy, and detect parameters from a physical random access channel, PRACH, indicative on the coverage enhancement level.

According to a third aspect, there is provided a computer program comprising instructions which, when executed on a processor of a wireless device, causes the wireless device to perform the method according to the first aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 1:
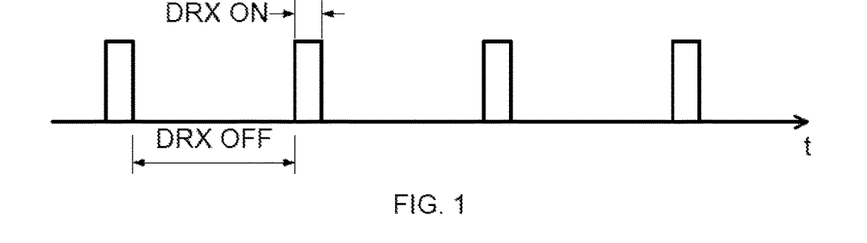
FIG. 1 schematically illustrates DRX ON and OFF periods.
Figure 2:
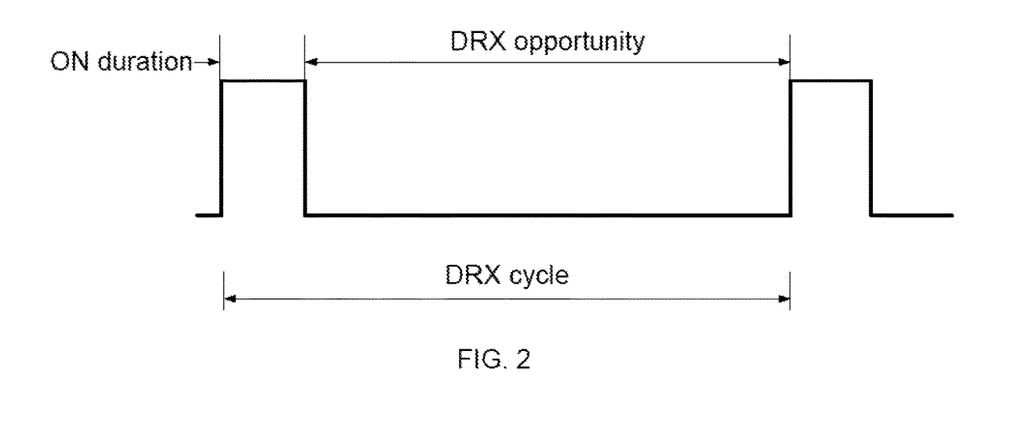
FIG. 2 schematically illustrates a DRX cycle.

In LTE, Discontinuous Reception (DRX) cycle is used to enable the UE to save energy, e.g. to provide long exchange or charging cycles of its battery. FIG. 1 schematically illustrates DRX ON and OFF periods, i.e. where a receiver is active or deactivated, respectively. FIG. 2 schematically illustrates a DRX cycle. The DRX cycle is used in Radio Resource Control (RRC) idle state but it can also be used in RRC connected state. Examples of lengths of DRX cycles currently used in RRC idle state are 320 ms, 640 ms, 1.28 s and 2.56 s. Examples of lengths of DRX cycles currently used in RRC connected state may range from 2 ms to 2.56 s. Enhanced DRX (eDRX) cycles are expected to be very long, e.g. ranging from several seconds to several minutes and even up to one or more hours. Typical values of eDRX cycles may be between 4-10 minutes.

The DRX cycle is configured by the network node and is characterized by the following parameters:

On duration: During the on duration of the DRX cycle a timer called 'onDurationTimer', which is configured by the network node, is running. This timer specifies the number of consecutive control channel subframes (e.g. PDCCH, ePDCCH subframe(s)) at the beginning of a DRX Cycle. It is also interchangeably called as DRX ON period, as illustrated in FIG. 1. More specifically it is the duration in downlink subframes that the UE, after waking up from DRX OFF to receive a control channel (e.g. PDCCH, ePDCCH). If the UE successfully decodes the control channel (e.g. PDCCH, ePDCCH) during the DRX ON duration, then the UE starts a drx-inactivity timer (see below) and stays awake until its expiry. When the onDurationTimer is running, the UE is considered to be in DRX state of the DRX cycle.

drx-inactivity timer: It specifies the number of consecutive control channel (e.g. PDCCH, ePDCCH) subframe(s) after the subframe in which a control channel (e.g. PDCCH) indicates an initial UL or DL user data transmission for this Medium Access Control (MAC) entity. The drx-inactivity timer is also configured by the network node. When the drx-inactivity timer is running, the UE is considered to be in non-DRX state i.e. no DRX is used.

Active time: This time is the duration during which the UE monitors the control channel (e.g. PDCCH, ePDCCH). In other words, this is the total duration during which the UE receiver is awake. This includes the "on-duration" of the DRX cycle, the time during which the UE is performing continuous reception while the inactivity timer has not expired and the time the UE is performing continuous reception while waiting for a DL retransmission after one Hybrid Automatic Repeat Request (HARQ) Round Trip Time (RTT). The minimum active time is equal to the length of an on duration, and the maximum active time is undefined (infinite).

DRX configuration herein may also be an enhanced or extended DRX (eDRX) configuration. In legacy DRX related procedures the UE can be configured with DRX cycle length of up to 2.56 seconds. But UEs supporting eDRX can be configured with a DRX cycle at least longer than 2.56 seconds and typically much longer than 2.56 seconds i.e. in order of several seconds to several minutes. The eDRX configuration parameters include an eDRX cycle length, paging window length, also referred to as paging time window (PTW) length etc. Within a PTW of the eDRX, the UE is further configured with one or more legacy DRX cycles.

Figure 3:
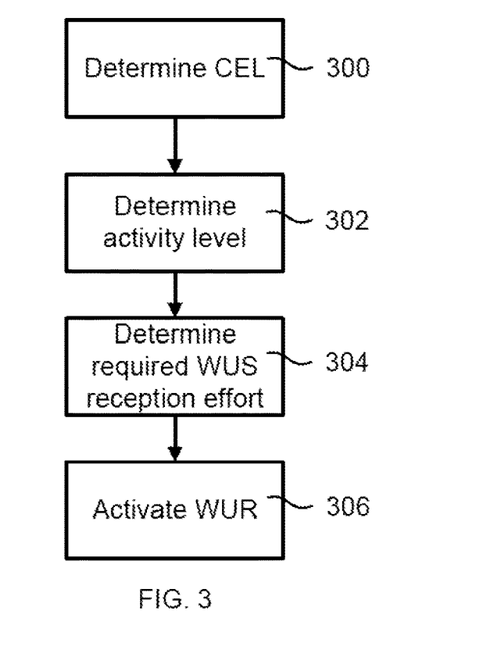
FIG. 3 is a flow chart illustrating a method according to an embodiment.

This disclosure suggests a method in a wireless device, such as a UE, for detecting a wake-up signal for a sufficient duration to detect whether there is a WUS with sufficient certainty, should it be present, but not much longer in order not to waste energy in the wireless device. FIG. 3 is a flow chart illustrating a method according to an embodiment. In a first step, the wireless device determines 300 a present coverage enhancement (CE) level with regard to a cell, e.g. serving cell. Coverage level or more specifically coverage enhancement (CE) level is here referring to for example: a coupling loss within a cell (e.g. between the serving eNB and the UE), received signal level at the wireless device with regard to a cell (e.g. UE signal strength, signal quality etc.). In a second step, the wireless device determines 302 an activity level of the wireless device. The activity level for example comprises one or more of a DRX cycle configuration, an applied bit-rate, mobility state, etc., and is an indication of a state of network synchronization of the wireless device such that a lower activity implies less synchronization. In a third step, the wireless device determines 304 a required WUS repetition effort, i.e. a level that is required for receiving the WUS with a sufficient detection likelihood, based on the determined coverage level and the UE activity level. The WUS reception effort comprises an amount of a redundancy inherent in the transmission of the of the wake-up signal being exploited at reception, based at least one of the coverage enhancement level and the activity level. Finally, the UE attempts to detect the WUS, based on the determined WUS repetition level. This includes activating 306 the WUR such that the WUS can be detected. As elucidated above, the WUR may be a separate receiver or a low-power state of a main receiver. The activating 306 of the wake-up receiver may comprise enabling reception of the wake-up signal during a determined time period and then deactivating the WUR to consume a limited amount of energy.

The provided redundancy of the WUS may for example comprise repetitions of the WUS. The reception effort can in such cases comprise an amount of repetitions to receive, e.g. by determining a time window sufficient to collect the determined amount of repetitions. A time period for the time window may for example be determined as a period covering the least amount of repetitions of the WUS exceeding a determined amount of redundancy of the WUS to be received. This puts the certainty of proper detection on the right side of the probability bound while keeping down the effort and thus the energy consumption.

The activity level can for example comprises one or more of DRX configuration, mobility state of the wireless device, e.g. based on history or knowledge about changes in channel, and type of service or application operated by the main receiver, such as bit-rate, requirements on latency, etc.

The CE levels may for example comprise one level where no CE is applied, i.e. only basic requirements of capability to receive a signal is applied, and one or more levels enabling reception of weaker signals. For example, application of no CE provides for reception of signals with a ratio between received energy per resource element and received power spectral density of total noise and interference above −6 dB, while the one or more CE levels may provide for reception of signals with a ratio between received energy per resource element and received power spectral density of total noise and interference more or less below −6 dB, e.g. −11 dB and −15 dB. CE may also be in view of other parameters indicating ability to receive weaker signals. One parameter which may be considered is Max Coupling Loss (MCL) which indicates a worst case coupling loss within a cell, e.g. between the network node and the wireless device, where normal MCL, i.e. without CE, may be 144 dB loss for MTC, while a first CE level may be 154 dB loss and a second CE level may be 164 dB loss. Still another parameter may be ability to handle Signal-to-Noise Ratio (SNR) where the normal requirement may be −2.5 dB, and a first CE level may be −12.5 dB and a second CE level may be −22.5 dB.

The determining of provided CE level may be made from different information resources, internally or externally. For example, it may include receiving information from the network node about configuration of assigned redundancy, measuring signals from the network node to determine assigned redundancy, accessing historical data about assigned redundancy, and detecting parameters from a physical random access channel, PRACH, indicative on the coverage enhancement level.

In summary the disclosure discloses a mechanism in a UE and a network node to determine a number of WUS repetitions with which WUS signal should be transmitted to the UE, based on a UE CE level with regard to a cell (e.g. serving cell) and a UE activity level e.g. UE DRX cycle length. The relation between the WUS repetitions, CE level and UE activity level be pre-defined (e.g. in terms of pre-defined mapping table) or it can be signalled to the UE (e.g. in system information such as in a SIB). The determined information about the WUS repetitions is used by the network node for transmitting the WUS signal to the based on the UE's current activity level and UE's current CE level with regard to the cell. The determined information is also used by the UE for receiving and decoding the WUS based on its current activity level and CE level with regard to the cell.

In some embodiments a more general meaning of the term "network node" is used where it can correspond to any type of radio network node or any network node, which communicates with a UE and/or with another network node. Examples of network nodes are NodeB, Master eNodeB (MeNB), Secondary eNodeB (SeNB), a network node belonging to Master Cell Group (MCG) or Secondary Cell Group (SCG), base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Centre (MSC), Mobility Management Entity (MME), etc), Operation and Management (O&M), Operations and Support System (OSS), Self-Organising Network (SON), positioning node (e.g. Evolved Serving Mobile Location Centre (E-SMLC)), Minimization of Drive Tests (MDT), test equipment (physical node or software), etc.

In some embodiments the non-limiting term UE or wireless device is used, and it refers to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Universal Serial Bus (USB) dongles, Proximity Service (ProSe) UE, Vehicle-to-Vehicle (V2V) UE, Vehicle-to-everything (V2X) UE, etc.

The embodiments are described for LTE e.g. MTC and NB-IoT. However, the embodiments are applicable to any Radio Access Technology (RAT) or multi-RAT systems, where the UE receives and/or transmit signals (e.g. data) e.g. LTE Frequency Division Duplex (FDD)/Time Division Duplex (TDD), Wideband Code Division Multiple Access (WCDMA)/High-Speed Packet Access (HSPA), Global System for Mobile communication (GSM)/GSM Enhanced Data rates for Global Evolution (EDGE) Radio Access Network (GERAN), Wi-Fi® (registered trademark of Wi-Fi Alliance), Wireless Local Area Network (WLAN), Code Division Multiple Access 2000 (CDMA2000), $5^{th}$ Generation mobile network (5G), New Radio (NR), etc.

The term time resource used herein may correspond to any type of physical resource or radio resource expressed in terms of length of time. Examples of time resources are: symbol, mini-slot, time slot, subframe, radio frame, Transmission Time Interval (TTI), short TTI, interleaving time, etc.

The scenario comprising a UE served by a first cell (cell1). Cell1 is managed or served or operated by a network node (NW1) e.g. a base station. The UE operates in a certain CE level with regard to a certain cell e.g. with regard to cell1. The UE is configured to receive signals (e.g. paging, WUS, NPDCCH, MPDCCH, Physical DL Shared Channel (PDSCH), MTC PDSCH (MPDSCH), etc) from at least cell1. The UE may further be configured performing one or more measurement on cell1 and one or more additional cells e.g. neighbour cells.

The CE level of the UE is also interchangeably called as coverage level of the UE. The CE level can be expressed in terms of:
 received signal quality and/or received signal strength at the UE with regard to a cell and/or
 received signal quality and/or received signal strength at a cell with regard to the UE.

The CE level of the UE be defined with respect to any cell such as serving cell, a neighbour cell, a reference cell etc. For example, it can be expressed in terms of received signal quality and/or received signal strength at the UE with regard to a target cell on which the UE performs one or more radio measurements. Examples of signal quality are Signal-to-Noise Ratio (SNR), Signal-to-Interference-and-Noise Ratio (SINR), Channel Quality Indicator (CQI), Reference Signal Received Quality (RSRQ), NB-IoT RSRQ (NRSRQ), Cell-specific Reference Signal (CRS) $\hat{E}s/Iot$, SCH $\hat{E}s/Iot$ etc. Examples of signal strength are path loss, couple loss, Reference Signal Received Power (RSRP), NB-IoT RSRP (NRSRP), Synchronisation Channel Received Power (SCH RP), etc. The notation $\hat{E}s/Iot$ is defined as ratio of
 $\hat{E}s$, which is the received energy per Resource Element (RE) (power normalized to the subcarrier spacing) during the useful part of the symbol, i.e. excluding the cyclic prefix, at the UE antenna connector, to
 Iot which is the received power spectral density of the total noise and interference for a certain RE (power integrated over the RE and normalized to the subcarrier spacing) as measured at the UE antenna connector The CE level can be expressed in at least two different levels. Consider an example of two different CE levels defined with regard to signal quality (e.g. SNR) at the UE comprising of:
 Coverage enhancement level 1 (CE1) comprising of $SNR \geq -6$ dB at UE with regard to a cell; and
 Coverage enhancement level 2 (CE2) comprising of $-15$ dB $\leq SNR < -6$ dB at UE with regard to a cell.

In the above example the CE1 may also be interchangeably called as normal coverage level (NCL), baseline coverage level, reference coverage level, basic coverage level, legacy coverage level etc., i.e. actually no coverage enhancement, only basic requirements. On the other hand, CE2 may be termed as enhanced coverage level or extended coverage level (ECL).

In another example two different coverage levels (e.g. normal coverage and enhanced coverage) may be defined in terms of signal quality levels as follows:
 The requirements for normal coverage are applicable for the UE category NB1 with regard to a cell provided that radio conditions of the UE with respect to that cell are defined as follows SCH $\hat{E}s/Iot$ above $-6$ dB and CRS $\hat{E}s/Iot$ above $-6$ dB.
 The requirements for enhanced coverage are applicable for the UE category NB1 with regard to a cell provided that radio conditions of the UE with respect to that cell are defined as follows SCH $\hat{E}s/Iot$ above $-15$ dB and CRS $\hat{E}s/Iot$ above $-15$ dB.

In another example one or more parameters defining CE of the UE with respect to a cell (e.g. serving cell, neighbour cell etc) may also be signalled to the UE by the network node. Examples of such parameters are CE Mode A and CE Mode B signalled to UE category M1, UE category M2 etc. The UE configured with CE Mode A and CE Mode B are also said to operate in normal coverage and enhanced coverage respectively. For example:

The requirements for CE Mode A apply provided the UE category M1 or UE category M2 is configured with CE Mode A, SCH Ês/Iot above −6 dB and CRS Ês/Iot above −6 dB.

The requirements for CE Mode B shall apply provided the UE category M1 or UE category M2 is configured with CE Mode B, SCH Ês/Iot above −15 dB and CRS Ês/Iot above −15 dB.

In another example, the UE may also determine the CE level with regard to a cell (e.g. cell1 etc) during the random access transmission procedure to that cell. For example, the UE selects the random access transmission resources (e.g. repetition level of RA channels) which are associated with different CE levels (e.g. PRACH CE level 0, CE level 1, CE level 2 etc) based on the received signal level (e.g. RSRP, NRSRP etc). The UE selects or determines the CE level (e.g. PRACH CE level) based on the signal measurement results performed by the UE (e.g. RSRP, NRSRP, path loss).

In general, in larger CE level the UE is capable of operating under received signal level (e.g. RSRP, path loss, SNR, SINR, Ês/Iot, RSRQ etc) which is lower than the received signal level in smaller CE level. The embodiments are applicable for any number of CE levels of the UE with regard to a cell e.g. CE1, CE2, CE3, CE4 etc. In this example CE1 corresponds to smallest CE level while CE2 corresponds to larger CE level with regard to CE1 but smaller with regard to CE3 and CE3 corresponds to larger CE level with regard to CE2 but smaller with regard to CE4 and so on.

This disclosure suggests a method in a wireless device which is attempting to detect a WUS, to know if the wireless device should continue to decode an MDPCCH/NDPCCH or go back to sleep. The WUS is transmitted from a wireless network node, e.g. eNB, when said node is attempting to page the wireless device, as demonstrated with reference to FIG. 3.

In a first step 300, the UE obtains information about UE CE level with respect to a cell e.g. with regard to first cell (cell1).

The CE level can be determined by the UE based on one or more of the following exemplary mechanisms:

by receiving information from the NW1 e.g. configured by the network node whether the UE is in normal or in enhanced coverage as described above, by performing one or more measurements on signals of cell e.g. measurement on signals of cell1 as described above, based on historical data or statistics e.g. CE level used by the UE in the last T0 seconds, based on PRACH parameters used during random access procedure to cell1 (e.g. based on association between the CE level and the PRACH parameters as described above) etc.

In a second step 302, the UE determines an activity level of the UE. The activity level is an indication of a state of the UE synchronization with respect to the network (e.g. with regard to cell1) such that a lower UE activity level implies less synchronization and a higher UE activity level implies better synchronization. As an example, the UE activity level can be expressed in terms of one or more of the following criteria:

DRX configuration of the UE and

Type of service or application being used by the UE.

The above criteria are elaborated below with examples:

The DRX related information obtained by the UE node is described above. The used DRX related information is known to the UE since UE has received this configuration from the cell and uses it. The UE may also obtain this information from a third-party node (which may be the case for IoT type of devices) or any other network devices. From this information, UE knows how frequent a UE is going to be awake, for how long it is going to be awake, and its active time.

Since IoT type of devices are typically expected to be receiving or transmitting infrequent bursts of short data packets, the UE may be configured with DRX configurations that allows the UE to sleep for long time and save its battery life. However, there might be different types of IoT devices which require different types of DRX configurations. For example, one device is deployed in an office environment might be configured be awake relatively frequently while another device which is deployed in a farming field might be configured to be only awake occasionally during a day. The former UE might be configured with normal DRX with a DRX length of 2.56 seconds while the latter UE might be configured with eDRX with an eDRX length of 40+ minutes.

Similar to the DRX cycle lengths, also the activity time may also differ depending on the device type.

In one embodiment the activity level is determined indirectly by the DRX or eDRX cycle duration, the PTW duration and/or number of WUS attempts without WUS was detected. For all the above cases, a longer duration implies a lower activity, in turn implying a need for longer WUS detection duration.

The obtained information about the type of service or application may further comprise one or more of the following:

device type in terms of its mobility state; e.g. whether it is a stationary device, or mobile device, so semi-mobile device etc. This in turn may indicate the type of service used by the UE. For example, a stationary device, which can be a sensor, may transmit and/or receive data very infrequently e.g. once every 15-30 minutes. In this case the UE activity level may be considered low. But if the device exhibits some level of mobility (i.e. it moves frequently or occasionally) then its activity level is considered to be moderate or high. The own mobility state should be known to the UE and can be determined based on one or more of the following mechanism: rate of cell changes (e.g. number handovers per unit time), Doppler speed of the UE estimated by the UE, based on changes in measurements, or based on information received from other nodes in the network, e.g. positioning node, core-network, third-party node, etc.

Specific type of service or application for which the device is being used; e.g. for temperature monitoring, in houses for alarm monitoring, in buildings for detecting activity, in farming fields etc. This type of information can be obtained from:

A network node storing information about the application or service used by the UE e.g. by core network node, third-party node etc.

third party node application server subscription information or operator data

SIM card

Historical data or statistics

Estimation of traffic activity e.g. average UE bit rate, relation between average UE bit rate and peak UE bit rate etc.

The mobility of the device may also depend on the type of service/application it is used for offering. For example, IoT devices deployed in a field might be stationary while the IoT devices deployed in vehicles might be mobile.

In a third step 304, the UE determines a WUS repetition level (and thereby also the WUS detection time) that is required for receiving the WUS with a sufficient detection likelihood, based on the UE CE level and the UE activity level.

Below it is described how the UE uses the determined information about the UE CE level and the UE activity level to determine the repetition number of WUS to successfully decode the WUS, i.e. with good likelihood of not using more or less repetitions than necessary number of WUS repetitions. The determination can be based on a relation between the number of WUS repetitions, the UE CE level and the UE activity level. The relation can be pre-defined (e.g. in terms of pre-defined mapping table) or can be signalled to the UE (e.g. in system information such as in a SIB).

Each repetition of WUS may comprise a time resource e.g. slot, subframe, TTI, shortened TTI (sTTI), etc. All repetitions within one group of repetitions contains the same signal. This enables the UE receiver to combine all the repetitions within the same group to enhance the decoding performance.

As a general rule or principle, the number of WUS repetitions required by the UE to decode the WUS signal increases with the increase in the DRX cycle length, and it further increases with the increase in the UE CE level. The larger number of WUS repetitions in longer DRX cycle length and under larger CE level is required by the UE to receive WUS under lower SINR (e.g. down to −15 dB in CE2) and also when the UE has coarse synchronization with regard to serving cell (e.g. due to longer inactivity). This is elaborated with few specific examples below:

In a first example, the required number of repetitions or repetition level can be obtained from a pre-defined mapping table as shown in Table 1. The said mapping table can be determined based on the configured DRX length (as example of UE activity level), and coverage enhancement level of the UE, and the UE carries out the decoding of WUS using a suitable repetition based on the associated between the UE CE level and the UE activity level (e.g. DRX cycle length). An example of possible mapping table is shown in Table 1, where CE1 and normal coverage level (NCL) are referred to UEs operating under normal coverage conditions while CE2 and extended coverage level (ECL) are referred to operation under enhanced coverage.

TABLE 1

An example of WUS repetition level UE shall assume for normal and enhanced coverage levels

| CE level | DRX cycle lengths | Required number of repetition of WUS signal |
|---|---|---|
| CE1 (NCL) | DRX cycle < Ha1 | N1 |
| CE1 (NCL) | DRX cycle length ≥ Ha1 | N2 |
| CE2 (ECL) | DRX cycle < Ha11 | N11 |
| CE2 (ECL) | DRX cycle length ≥ Ha11 | N22 |

In this example, a UE operating under normal coverage (CE1) and whose configured DRX cycle length is greater than or equal to a first activity threshold known as Ha1 shall detect WUS using a maximum repetition of WUS of N2. Otherwise, under CE1 and when configured DRX cycle length is less than Ha1 then the UE shall decode WUS using a maximum repetition of WUS of N1. On the other hand, a UE operating under enhanced coverage (CE2) may need larger number of WUS repetitions to be able to decode the same signal due to more challenging channel conditions (e.g. lower SINR) compared to the number of WUS repetitions needed in CE1 for the same DRX cycle length. The DRX threshold (Ha11) used under enhanced coverage to determine the number of WUS repetitions may be the same as Ha1 or Ha1 and Ha11 may be different. In addition, the UE may also require more repetitions after a longer inactive period, e.g. it may lose synchronization after its receiver has been switched off for long duration. Therefore, the values in the tables may have following relation: N2>N1, and N11>N1, and N22>N11 and N22>N1, and N22>N2. Examples of value N1 and N2 are 4 subframes, and 16 subframes. And examples of values of N11 and N22 are 128 subframes and 1024 subframes.

The table in above example contains the mapping for both normal and enhanced coverage. But this can also be split into two separate tables, one mapping between number of WUS repetition and DRX cycle length for each coverage mode as shown in Tables 2 and 3. The tables show only examples of mapping between number of WUS repetition and DRX cycle length using CE levels within each coverage enhancement mode. However, it shall be noted that same principle can be applied using multiple CE levels. Similarly, the UE activity levels (DRX cycle length thresholds) can also be split into multiple levels and intervals, and same principle can be applied.

TABLE 2

An example of WUS repetition level UE shall assume for normal coverage level

| CE level | DRX cycle lengths | Required number of repetition of WUS signal |
|---|---|---|
| CE1 (NCL) | DRX cycle < Ha1 | N1 |
| CE1 (NCL) | DRX cycle length ≥ Ha1 | N2 |

TABLE 3

An example of WUS repetition level UE shall assume for enhanced coverage level

| CE level | DRX cycle lengths | Required number of repetition of WUS signal |
|---|---|---|
| CE2 (ECL) | DRX cycle < Ha11 | N11 |
| CE2 (ECL) | DRX cycle length ≥ Ha11 | N22 |

In a second example, the UE activity level can be defined based on UE's mobility state. An example of the mapping between the required number of repetitions of WUS signal and the UE's mobility state is shown in Table 4. A larger number of repetitions of WUS signal is required by the UE to decode the WUS signal in mobile state compared to those in the stationary state. The mobility state of the UE can be autonomously determined by the UE or can be signalled to the UE by e.g. a network node (eNodeB). The UE mobility state can be further expressed in terms of one or more metrics, such as X1 km/hour, X2 m/s, X3 Hz of Doppler, a range of speed, handover among different network nodes etc. For example, if the UE speed (V) is less than or equal to K Hertz then the UE is considered to be stationary; otherwise if V>K, then the UE is considered to be mobile.

In yet another example the required number of repetitions of WUS signal is further dependent on the UE mobility state, DRX cycle length and CE level of the UE. For example, required number of repetitions of WUS signal when DRX cycle is below threshold (e.g. Ha1), UE CE level is CE1 and the UE is stationary, is smaller compared to the case when DRX cycle is above or equal to threshold (e.g. Ha1), UE CE level is CE2 and the UE is mobile.

TABLE 4

An example of WUS repetition level UE shall assume for normal and enhanced coverage levels

| CE level | Mobility state | Required number of repetition of WUS signal |
| --- | --- | --- |
| CE1 (NCL) | Stationary | N1 |
| CE1 (NCL) | Mobile | N2 |
| CE2 (ECL) | Stationary | N11 |
| CE2 (ECL) | Mobile | N22 |

Typically, the required WUS repetition level will increase with an increased coverage level, implying worse reception, and increase with a decreased activity level, implying a less synchronized UE. Hence, in one embodiment, the WUS repetition level, R, is larger than a threshold H1 if the coverage level is enhanced coverage (EC) or higher and/or the UE activity is below a threshold, e.g., such that the UE is not synchronized to within a cyclic prefix. In another embodiment, the WUS repetition level, R, is larger than another threshold H2 if the coverage level is normal coverage (NC) and the activity level is below a threshold such that the UE is not synchronized to within a cyclic prefix.

According to another aspect of this embodiment the network node also determines the required number of WUS repetitions as function of the UE DRX cycle and UE CE level with regard to cell1 e.g. based on the examples in Tables 1-4. The network node is aware of the UE DRX cycle and can also determine the UE CE level e.g. during RACH procedure, based on signal measurements etc. The network node further transmits the WUS signal to the UE with the determined number of repetitions to ensure that the UE is able to successfully receive the WUS signal.

Finally, the UE attempts 306 to detect the WUS, based on the determined WUS repetition level in previous step. The UE uses the result of the decoded WUS signal to decide whether to continue attempt to decode the subsequent DL control channel (xPDCCH, where "x" may be "N" for NB-IoT, i.e. NPDCCH, or "M" for MTC, i.e. MPDCCH), or to it can switch to inactive mode (i.e. turn off the receiver chain until next UE active period).

If the UE successfully decode the WUS then it shall start decoding other related DL channels e.g. MPDCCH or NPDCH to acquire paging. But if the UE cannot successfully decode the WUS then it may not attempt to decode other related DL channels and instead go to sleep.

As the coverage of the WUS should be similar to the corresponding xPDCCH that carries the paging DCI, the UE can use the information obtained from detection of the WUS as a guideline for the decoding of the subsequent xPDCCH. In a further embodiment, the UE can determine a number of xPDCCH repetitions it needs to attempt to decode based on the time it spends on detecting the WUS. That is, the UE only needs to try to decode a certain number of xPDCCH repetitions that provide the similar coverage level as it determines from WUS detection.

For example, the UE may also use the number of WUS detections for determining a number of xPDCCH repetitions, such that a higher number of WUS repetitions also implies a higher number of xPDCCH repetitions.

In another aspect of this embodiment, the WUS repetition level is related to the accumulation of the WUS, such that more coherently combined candidate WUS symbols may reduce the WUS repetitions.

In another example if the UE cannot decode WUS signal after successfully receiving WUS signal with all repetitions then the UE may inform this information to the network node e.g. to cell1 when the UE goes into connected state.

Figure 4:
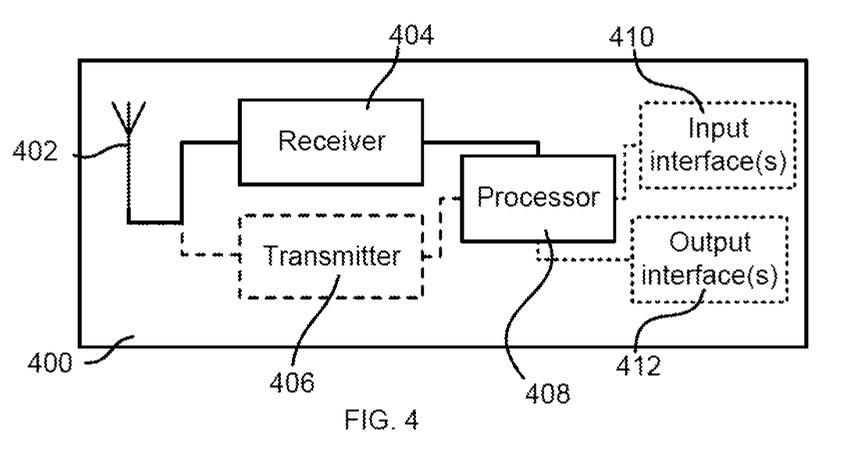
FIG. 4 is a block diagram schematically illustrating a wireless device according to an embodiment.

FIG. 4 is a block diagram schematically illustrating a wireless device 400 according to an embodiment. The wireless device comprises an antenna arrangement 402, a receiver 404 connected to the antenna arrangement 402, a transmitter 406 connected to the antenna arrangement 402, a processing element 408 which may comprise one or more circuits, one or more input interfaces 410 and one or more output interfaces 412. The interfaces 410, 412 can be user interfaces and/or signal interfaces, e.g. electrical or optical. The wireless device 400 is arranged to operate in a cellular communication network. In particular, by the processing element 408 being arranged to perform the embodiments demonstrated with reference to FIG. 3, the wireless device 400 is capable of low-power operation. The processing element 408 can also fulfil a multitude of tasks, ranging from signal processing to enable reception and transmission since it is connected to the receiver 404 and transmitter 406, executing applications, controlling the interfaces 410, 412, etc.

Figure 5:
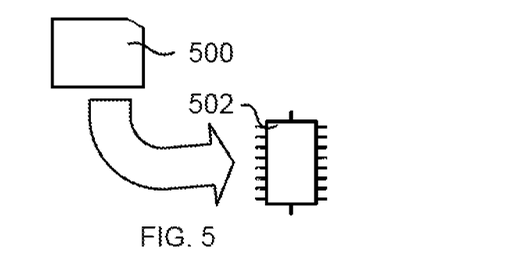
FIG. 5 schematically illustrates a computer-readable medium and a processing device.

The methods according to the present disclosure is suitable for implementation with aid of processing means, such as computers and/or processors, especially for the case where the processing element 408 demonstrated above comprises a processor which may be arranged for supporting the handling the power-saving activation/deactivation of the wake-up receiver. Therefore, there is provided computer programs, comprising instructions arranged to cause the processing means, processor, or computer to perform the steps of any of the methods according to any of the embodiments described with reference to FIG. 3. The computer programs preferably comprise program code which is stored on a computer readable medium 500, as illustrated in FIG. 5, which can be loaded and executed by a processing means, processor, or computer 502 to cause it to perform the methods, respectively, according to embodiments of the present disclosure, preferably as any of the embodiments described with reference to FIG. 3. The computer 502 and computer program product 500 can be arranged to execute the program code sequentially where actions of the any of the methods are performed stepwise, or according to a real-time basis. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

Figure 6:
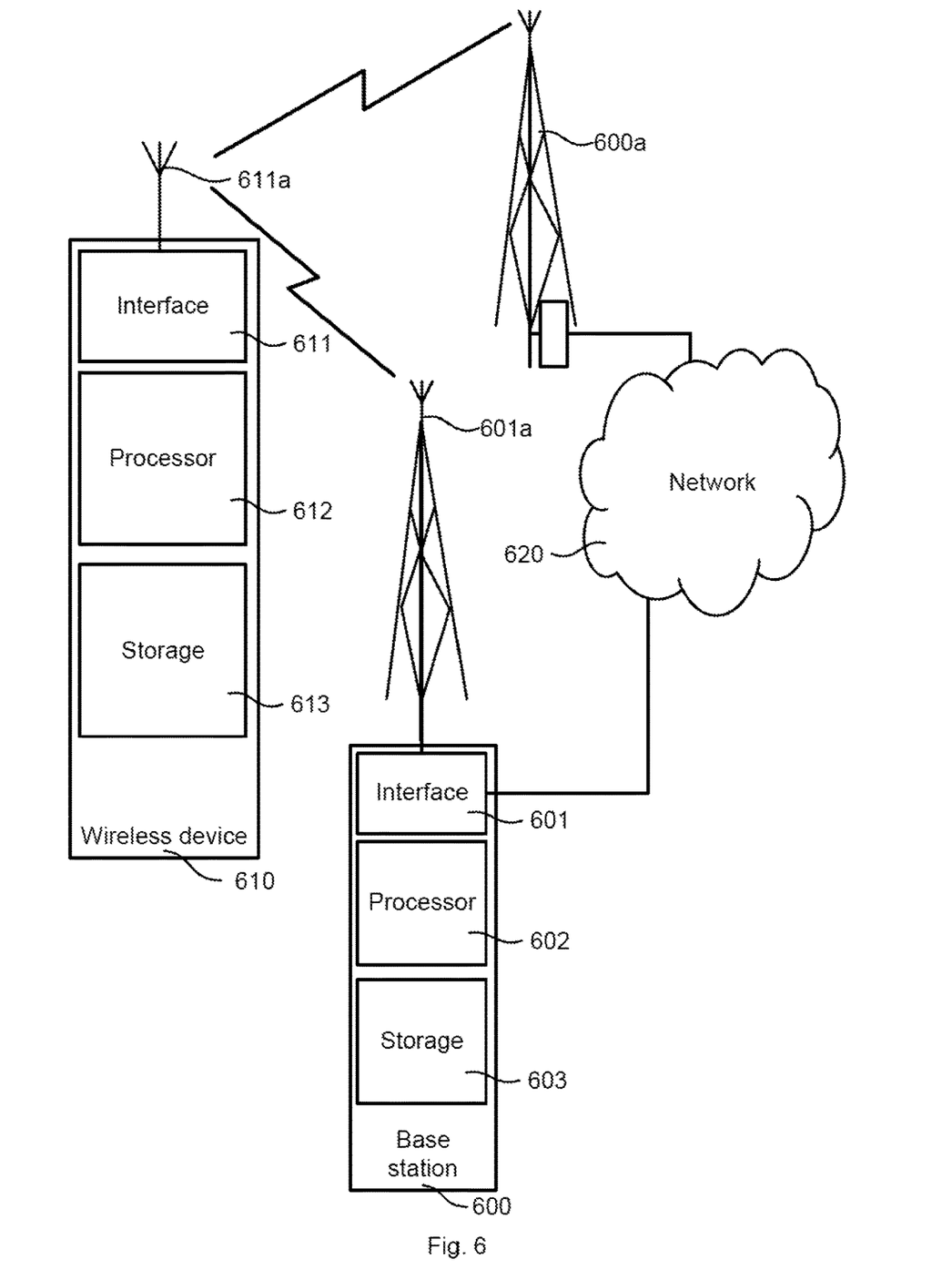
FIG. 6 schematically illustrates a wireless communication system.

FIG. 6 illustrates a cellular wireless network comprising a more detailed view of an access network node 600 and a wireless device 610, in accordance with a particular embodiment. For simplicity, FIG. 6 only depicts network 620, access network nodes 600 and 600a, and wireless device 610. Access network node 600 comprises processor 602, storage 603, interface 601, and antenna set 601a. Similarly, the wireless device 610 comprises processor 612, storage 613, interface 611 and antenna set 611a. These components may work together in order to provide access network node and/or wireless device functionality. In different embodiments, the wireless network may comprise any number of wired or wireless networks, access network nodes, base stations, controllers, wireless devices, relay stations, and/or any other components that may facilitate or participate in the communication of data and/or signals whether via wired or wireless connections.

Network 620 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Access network node 600 comprises processor 602, storage 603, interface 601, and antenna set 601a. These components are depicted as single boxes located within a single larger box. In practice however, an access network node may comprise multiple different physical components that make up a single illustrated component (e.g., interface 601 may comprise terminals for coupling wires for a wired connection and a radio transceiver for a wireless connection). Similarly, access network node 600 may be composed of multiple physically separate components (e.g., a NodeB component and a Radio Network Controller (RNC) component, a Base Transceiver Station (BTS) component and a Base Station Controller (BSC) component, etc.), which may each have their own respective processor, storage, and interface components. In certain scenarios in which access network node 600 comprises multiple separate components (e.g., BTS and BSC components), one or more of the separate components may be shared among several access network nodes. For example, a single RNC may control multiple NodeBs. In such a scenario, each unique NodeB and BSC pair, may be a separate access network node. In some embodiments, access network node 600 may be configured to support multiple radio access technologies (RATs). In such embodiments, some components may be duplicated (e.g., separate storage 603 for the different RATs) and some components may be reused (e.g., the same antenna set 601a may be shared by the RATs).

Processor 602 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other access network node 600 components, such as storage 603, access network node 600 functionality. For example, processor 602 may execute instructions stored in storage 603. Such functionality may include providing various wireless features discussed herein to a wireless terminal device, such as wireless device 610, including any of the features or benefits disclosed herein.

Storage 603 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 603 may store any suitable instructions, data or information, including software and encoded logic, utilized by access network node 600. Storage 603 may be used to store any calculations made by processor 602 and/or any data received via interface 601.

Access network node 600 also comprises interface 601 which may be used in the wired or wireless communication of signalling and/or data between access network node 600, network 620, and/or wireless device 610. For example, interface 601 may perform any formatting, coding, or translating that may be needed to allow access network node 600 to send and receive data from network 620 over a wired connection. Interface 601 may also include a radio transmitter and/or receiver that may be coupled to or a part of antenna set 601a. The radio may receive digital data that is to be sent out to other access network nodes or wireless devices via a wireless connection. The radio may convert the digital data into a radio signal having the appropriate channel and bandwidth parameters. The radio signal may then be transmitted via antenna set 601a to the appropriate recipient (e.g., wireless device 610).

Antenna set 601a may be any type of antenna capable of transmitting and receiving data and/or signals wirelessly. Here, the antenna set 601a is to be considered as a plurality of antennas such that multi-rank transmissions are enabled. In some embodiments, antenna set 601a may comprise two or more omnidirectional, sector or panel antennas operable to transmit/receive radio signals between, for example, 700 MHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The wireless device 610 may be any type of communication device, communication transceiver, UE, D2D device or ProSe (Proximity Service) UE, but may in general be any device, sensor, actuator, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine-to-machine (M2M) communication, etc., which is able to wirelessly send and receive data and/or signals to and from a access network node, such as access network node 600 and/or other wireless devices. In the context of the disclosure, the wireless device 610 comprises a wake-up receiver capable of receiving a wake-up signal from the network node 600, wherein the wireless device 610 is selectable capable of coverage enhancement for enabling reception of a weak signal. Here, a weak signal is within the field, as discussed above, normally a signal which is below what a legacy device is required to be able to receive. For example, where a ratio between received energy per resource element and received power spectral density of total noise and interference is below −6 dB, since the −6 dB limit is an example on what is normally required by legacy receivers and thus a commonly used design for both devices and system. Similar limits are present also for other parameters, as also discussed above. Ability to deviate from this is therefore normally referred to as coverage enhancement. Detection of the proper wake-up signal by the wake-up receiver causes a provision of a control signal to a main receiver to start receiving. Alternatively, where a low-power mode of the main receiver constitutes the wake-up receiver, the detection of the proper wake-up signal causes a change of mode from the low-power mode to an ordinary mode of the main receiver. The wireless device 610 comprises processor 612, storage 613, interface 611, and antenna 611a. Like access network node 600, the components of wireless device 610 are depicted as single boxes located within a single larger box, however in practice a wireless device may comprises multiple different physical components that make up a single illustrated component (e.g., storage 613 may comprise multiple discrete microchips, each microchip representing a portion of the total storage capacity).

Processor 612 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 610 components, such as storage 613, wireless device 610 functionality. Such functionality may include providing various wireless features discussed herein, including any of the features or benefits disclosed herein.

Storage 613 may be any form of volatile or non-volatile memory including, without limitation, persistent storage, solid state memory, remotely mounted memory, magnetic media, optical media, RAM, ROM, removable media, or any other suitable local or remote memory component. Storage 613 may store any suitable data, instructions, or information, including software and encoded logic, utilized by wireless device 610. Storage 613 may be used to store any calculations made by processor 612 and/or any data received via interface 611.

Interface 611 may be used in the wireless communication of signalling and/or data between wireless device 610 and access network node 600. For example, interface 611 may perform any formatting, coding, or translating that may be needed to allow wireless device 610 to send and receive data from access network node 600 over a wireless connection. Interface 611 may also include a radio transmitter and/or receiver that may be coupled to or a part of antenna 611a. The radio may receive digital data that is to be sent out to access network node 601 via a wireless connection. The radio may convert the digital data into a radio signal having the appropriate channel and bandwidth parameters. The radio signal may then be transmitted via antenna 611a to access network node 600.

Antenna 611a may be any type of antenna capable of transmitting and receiving data and/or signals wirelessly. In some embodiments, antenna 611a may comprise one or more omnidirectional, sector or panel antennas operable to transmit/receive radio signals between e.g. 2 GHz and 66 GHz. For simplicity, antenna 611a may be considered a part of interface 611 to the extent that a wireless signal is being used.

In some embodiments, the components described above may be used to implement one or more functional modules used in the receiver. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 612 and/or 602, possibly in cooperation with storage 613 and/or 603. Processors 612 and/or 602 and storage 613 and/or 603 may thus be arranged to allow processors 612 and/or 602 to fetch instructions from storage 613 and/or 603 and execute the fetched instructions to allow the respective functional module to perform any features or functions disclosed herein. The modules may further be configured to perform other functions or steps not explicitly described herein but which would be within the knowledge of a person skilled in the art. The Disclosure May be Summarized by the Following Items:

1. A method of receiving a wake-up signal from a network node, performed by a wireless device selectable capable of coverage enhancement for enabling reception of weaker signals than legacy requirements, wherein detection of the proper wake-up signal causes a provision of a control signal to a main receiver to start receiving or change mode from a low-power mode to an ordinary mode of the main receiver, the method comprising determining provided coverage enhancement level based on assigned redundancy of the wake-up signal;

determining an activity level of the wireless device in based on communication with the network node;

determining a required wake-up signal reception effort, wherein the wake-up signal reception effort comprises an amount of the redundancy of the wake-up signal being exploited at reception, based at least one of the coverage enhancement level and the activity level; and activating a wake-up receiver of the wireless device based on the determined reception effort and receive the wake-up signal.

2. The method of item 1, wherein redundancy of the wake-up signal comprises repetitions of the wake-up signal, and the reception effort comprises an amount of repetitions to receive.

3. The method of item 1 or 2, wherein the activity level comprises at least one of:
discontinuous reception, DRX, configuration;
mobility state of the wireless device; and
type of service or application operated by the main receiver.

4. The method of any one of items 1 to 3, wherein
the determining of the required wake-up signal reception effort comprises determining a time period for enabling the amount of the redundancy of the wake-up signal to be received, and
the activating of the wake-up receiver comprises enabling reception of the wake-up signal during the time period and then deactivating the wake-up receiver.

5. The method of item 4, wherein the time period is determined as a period covering the least amount of repetitions of the wake-up signal exceeding a determined amount of redundancy of the wake-up signal to be received.

6. The method of any one of items 1 to 5, wherein the coverage enhancement level comprises
a level where no coverage enhancement is applied such that reception of a signal according to legacy requirements is enabled; and
one or more levels which when applied enables reception of a weaker signal than legacy requirements.

7. The method of any one of items 1 to 6, wherein the determining of provided coverage enhancement level based on assigned redundancy of the wake-up signal comprises at least one of:
receiving information from the network node about configuration of assigned redundancy;
measuring signals from the network node to determine assigned redundancy;
accessing historical data about assigned redundancy; and
detecting parameters from a physical random access channel, PRACH, indicative on the coverage enhancement level.

8. A wireless device comprising a wake-up receiver capable of receiving a wake-up signal from a network node, wherein the wireless device is selectable capable of coverage enhancement for enabling reception of weaker signals than legacy requirements, wherein detection of the proper wake-up signal by the wake-up receiver causes a provision of a control signal to a main receiver to start receiving or change mode from a low-power mode to an ordinary mode of the main receiver where the low-power mode of the main receiver constitutes the wake-up receiver, the wireless device being arranged to determine provided coverage enhancement level based on assigned redundancy of the wake-up signal;

determine an activity level of the wireless device in based on communication with the network node;

determine a required wake-up signal reception effort, wherein the wake-up signal reception effort comprises an amount of the redundancy of the wake-up signal being exploited at reception, based at least one of the coverage enhancement level and the activity level; and activate the wake-up receiver of the wireless device based on the determined reception effort and receive the wake-up signal.

9. The wireless device of item 8, wherein redundancy of the wake-up signal comprises repetitions of the wake-up signal, and the reception effort comprises an amount of repetitions to receive.

10. The wireless device of item 8 or 9, wherein the activity level comprises at least one of:

discontinuous reception, DRX, configuration;

mobility state of the wireless device; or type of service or application operated by the main receiver.

11. The wireless device of any one of items 8 to 10, wherein the determination of the required wake-up signal reception effort comprises a determination of a time period for enabling the amount of the redundancy of the wake-up signal to be received, and the activation of the wake-up receiver comprises reception enablement for receiving the wake-up signal during the time period and then deactivation of the wake-up receiver.

12. The wireless device of item 11, wherein the time period is determined as a period covering the least amount of repetitions of the wake-up signal exceeding a determined amount of redundancy of the wake-up signal to be received.

13. The wireless device of any one of items 8 to 12, wherein the coverage enhancement level comprises a level where no coverage enhancement is applied such that reception of a signal according to legacy requirements is enabled; and one or more levels which when applied enables reception of a weaker signal than legacy requirements.

14. The wireless device of any one of items 8 to 13, wherein the determination of provided coverage enhancement level based on assigned redundancy of the wake-up signal includes causing the wireless device to perform at least one of:

receive information from the network node about configuration of assigned redundancy;

measure signals from the network node to determine assigned redundancy;

access historical data about assigned redundancy; and detect parameters from a physical random access channel, PRACH, indicative on the coverage enhancement level.

15. A computer program comprising instructions which, when executed on a processor of a wireless device, causes the wireless device to perform the method according to any of items 1 to 7.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method of a wireless device for receiving a wake-up signal from a network node, the method comprising:

determining a coverage enhancement level with respect to the network node;

determining a discontinuous reception, DRX, cycle configuration of the wireless device;

determining a required amount of repetitions of the wake-up signal to receive, based on at least the coverage enhancement level and the DRX cycle configuration; and receiving the wake-up signal according to the determined amount of repetitions.

2. The method of claim 1, wherein the coverage enhancement levels comprise normal coverage level and enhanced coverage level.

3. The method of claim 1, wherein:

the determining of the required amount of repetitions comprises determining a time period for enabling the amount of the repetitions of the wake-up signal to be received; and the receiving of the wake-up signal comprises activating reception of the wake-up signal during the time period and then deactivating the wake-up receiver.

4. The method of claim 3, wherein the time period is determined as a period covering a least amount of repetitions of the wake-up signal exceeding a determined amount of repetitions of the wake-up signal to be received.

5. The method of claim 1, wherein the coverage enhancement levels comprise:

a normal coverage level where no coverage enhancement is applied such that reception of a signal according to basic requirements is enabled; and at least one enhanced coverage level which, when applied, enables reception of a weaker signal than the basic requirements.

6. The method of claim 1, wherein the determining of the coverage enhancement level with respect to the network node comprises at least one from a group consisting of:

receiving information from the network node about configuration of assigned redundancy;

measuring signals from the network node to determine assigned redundancy;

accessing historical data about assigned redundancy; and detecting parameters from a physical random access channel, PRACH, indicative of the coverage enhancement level.

7. A wireless device comprising a wake-up receiver capable of receiving a wake-up signal from a network node, the wireless device being configured to:

determine provided coverage enhancement level with respect to the network node;

determine a discontinuous reception, DRX, cycle configuration of the wireless device;

determine a required amount of repetitions of the wake-up signal to receive, based on at least the coverage enhancement level and the DRX cycle configuration; and receive the wake-up signal according to the determined amount of repetitions.

8. The wireless device of claim 7, wherein the coverage enhancement levels comprise normal coverage level and enhanced coverage level.

9. The wireless device of claim 7, wherein:
the determination of the amount of repetitions comprises a determination of a time period for enabling the amount of the repetitions of the wake-up signal to be received, and
the reception of the wake-up signal comprises activation of enablement for receiving the wake-up signal during the time period and then deactivation of the wake-up receiver.

10. The wireless device of claim 9, wherein the time period is determined as a period covering the least amount of repetitions of the wake-up signal exceeding a determined amount of redundancy of the wake-up signal to be received.

11. The wireless device of claim 7, wherein the coverage enhancement levels comprise:
a normal coverage level where no coverage enhancement is applied such that reception of a signal according to basic requirements is enabled; and
at least one enhanced coverage level which when applied enables reception of a weaker signal than the basic requirements.

12. The wireless device of claim 7, wherein the determination of provided coverage enhancement level with respect to the network node includes causing the wireless device to perform at least one from a group consisting of:
receive information from the network node about configuration of assigned redundancy;
measure signals from the network node to determine assigned redundancy;
access historical data about assigned redundancy; and
detect parameters from a physical random access channel, PRACH, indicative of the coverage enhancement level.

13. A non-transitory computer storage medium storing a computer program comprising instructions which, when executed on a processor of a wireless device, causes a wireless device to perform a method of receiving a wake-up signal from a network node, the method comprising:
determining a coverage enhancement level with respect to the network node;
determining a discontinuous reception, DRX, cycle configuration of the wireless device;
determining a required amount of repetitions of the wake-up signal to receive, based on at least the coverage enhancement level and the DRX cycle configuration; and
receiving the wake-up signal according to the determined amount of repetitions.

* * * * *

UNITED STATES PATENT AND TRADEMARK OFFICE
CERTIFICATE OF CORRECTION

| | |
|---|---|
| PATENT NO. | : 11,722,962 B2 |
| APPLICATION NO. | : 17/545576 |
| DATED | : August 8, 2023 |
| INVENTOR(S) | : Åström et al. |

It is certified that error appears in the above-identified patent and that said Letters Patent is hereby corrected as shown below:

On the Title Page

In Item (57), under "ABSTRACT", in Column 2, Line 8, delete "based at" and insert -- based on at --, therefor.

On Page 2, in Item (56), under "OTHER PUBLICATIONS", in Column 2, Line 12, delete "ZIE," and insert -- ZTE, --, therefor.

On Page 2, in Item (56), under "OTHER PUBLICATIONS", in Column 2, Line 28, delete "NBIoT;" and insert -- NB-IoT; --, therefor.

In the Specification

In Column 1, Line 9, delete "2019" and insert -- 2019, now Pat. No. 11,234,193, --, therefor.

In Column 1, Line 30, delete "one more" and insert -- one or more --, therefor.

In Column 1, Line 36, delete "Iot" and insert -- lot --, therefor.

In Column 2, Line 44, delete "respond the" and insert -- respond to the --, therefor.

In Column 2, Line 60, delete "one more" and insert -- one or more --, therefor.

In Column 3, Line 39, delete "indicative on" and insert -- indicative of --, therefor.

In Column 4, Line 17, delete "indicative on" and insert -- indicative of --, therefor.

In Column 6, Lines 1-2, delete "of the of the wake-up" and insert -- of the wake-up --, therefor.

In Column 6, Line 2, delete "based at" and insert -- based on at --, therefor.

Signed and Sealed this
Thirtieth Day of January, 2024

*Katherine Kelly Vidal*
*Director of the United States Patent and Trademark Office*

In Column 6, Lines 42-43, delete "Max Coupling Loss (MCL)" and insert -- Maximum Coupling Loss (MCL) --, therefor.

In Column 6, Line 58, delete "indicative on" and insert -- indicative of --, therefor.

In Column 7, Line 3, delete "signal to the based" and insert -- signal based --, therefor.

In Column 7, Line 24, delete "(etc),") and insert -- (etc.), --, therefor.

In Column 7, Lines 37-38, delete "laptop embedded equipped (LEE)," and insert -- laptop embedded equipment (LEE), --, therefor.

In Column 7, Line 62, delete "Celli" and insert -- Cell 1 --, therefor.

In Column 7, Line 67, delete "etc)" and insert -- etc.) --, therefor.

In Column 8, Line 1, delete "configured performing" and insert -- configured to perform --, therefor.

In Column 8, Lines 24-25, delete "(SCH RP)," and insert -- (SCH_RP), --, therefor.

In Column 8, Line 25, delete "ratio of" and insert -- ratio of: --, therefor.

In Column 8, Line 33, delete "connector" and insert -- connector. --, therefor.

In Column 8, Line 64, delete "etc)" and insert -- etc.) --, therefor.

In Column 9, Line 12, delete "etc)" and insert -- etc.) --, therefor.

In Column 9, Line 17, delete "etc)" and insert -- etc.) --, therefor.

In Column 9, Line 18, delete "etc)." and insert -- etc.). --, therefor.

In Column 9, Line 23, delete "etc)" and insert -- etc.) --, therefor.

In Column 9, Line 50, delete "TO" and insert -- T0 --, therefor.

In Column 9, Line 63, delete "UE and" and insert -- UE, and --, therefor.

In Column 10, Line 16, delete "configured be" and insert -- configured to be --, therefor.

In Column 14, Line 33, delete "handling the" and insert -- handling of the --, therefor.

In Column 16, Line 33, delete "laptop embedded equipped (LEE)," and insert -- laptop embedded equipment (LEE), --, therefor.

In Column 16, Line 49, delete "example on" and insert -- example of --, therefor.

In Column 18, Line 6, delete "comprising" and insert -- comprising: --, therefor.

In Column 18, Line 9, delete "device in" and insert -- device --, therefor.

In Column 18, Line 15, delete "based at" and insert -- based on at --, therefor.

In Column 18, Line 43, delete "comprises" and insert -- comprises: --, therefor.

In Column 18, Line 59, delete "indicative on" and insert -- indicative of --, therefor.

In Column 19, Line 3, delete "arranged to" and insert -- arranged to: --, therefor.

In Column 19, Line 11, delete "based at" and insert -- based on at --, therefor.

In Column 19, Line 40, delete "comprises" and insert -- comprises: --, therefor.

In Column 19, Line 57, delete "indicative on" and insert -- indicative of --, therefor.

In Column 20, Line 9, delete "and or" and insert -- and/or --, therefor.

In the Claims

In Column 21, Line 17, in Claim 10, delete "the least" and insert -- a least --, therefor.

In Column 22, Lines 14-15, in Claim 13, delete "a wireless device" and insert -- the wireless device --, therefor.